(12) United States Patent
Kim

(10) Patent No.: US 8,053,104 B2
(45) Date of Patent: Nov. 8, 2011

(54) POUCH TYPE BATTERY AND METHOD OF MAKING THE SAME

(75) Inventor: Joongheon Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1122 days.

(21) Appl. No.: 11/646,605

(22) Filed: Dec. 28, 2006

(65) Prior Publication Data

US 2007/0202398 A1 Aug. 30, 2007

(30) Foreign Application Priority Data

Dec. 29, 2005 (KR) .......... 10-2005-0134553
Dec. 29, 2005 (KR) .......... 10-2005-0134562

(51) Int. Cl.
*H01M 2/02* (2006.01)
*H01M 2/08* (2006.01)
*H01M 2/06* (2006.01)

(52) U.S. Cl. ........ 429/163; 429/100; 429/148; 429/167; 429/170; 429/171; 429/173; 429/176; 429/177; 429/180; 429/181; 429/185; 29/623.2

(58) Field of Classification Search .......... 429/100, 429/121, 148, 163, 167–174, 176, 177, 180, 429/181, 185; 29/623.2
See application file for complete search history.

(56) References Cited

U.S. PATENT DOCUMENTS

| | | | |
|---|---|---|---|
| 6,653,018 B2 * | 11/2003 | Takahashi et al. | ............ 429/185 |
| 6,902,844 B2 * | 6/2005 | Yageta et al. | ................. 429/185 |
| 7,166,389 B2 | 1/2007 | Hiratsuka et al. | |
| 7,534,525 B2 | 5/2009 | Hiratsuka et al. | |
| 7,556,885 B2 | 7/2009 | Yamada et al. | |
| 2003/0152766 A1 * | 8/2003 | Vargo et al. | ................... 428/343 |
| 2003/0186122 A1 | 10/2003 | Xing et al. | |
| 2004/0096735 A1 * | 5/2004 | Komatsu et al. | ............. 429/176 |
| 2004/0115527 A1 * | 6/2004 | Hiratsuka et al. | ............ 429/176 |
| 2005/0017678 A1 | 1/2005 | Hiratsuka et al. | |
| 2005/0136324 A1 * | 6/2005 | Yamada et al. | ............... 429/175 |
| 2006/0216591 A1 * | 9/2006 | Lee | .............................. 429/176 |
| 2007/0072071 A1 * | 3/2007 | Lee | .............................. 429/162 |
| 2007/0128513 A1 * | 6/2007 | Hatta et al. | .................... 429/176 |

(Continued)

FOREIGN PATENT DOCUMENTS

EP 0 975 031 A1 1/2000

(Continued)

*Primary Examiner* — Ula C. Ruddock
*Assistant Examiner* — Amanda Barrow
(74) *Attorney, Agent, or Firm* — Lee & Morse, P.C.

(57) ABSTRACT

A pouch type battery includes a pouch case having a front region, a rear region, first and second side regions, and a cover, wherein the first side region connects the front region to the rear region at a first side of the battery, and the second side region connects the front region to the rear region at a second side of the battery, the first and second sides being opposite to one another, the rear region has a recess therein to accommodate an electrode assembly, and two extending portions extend from first and second sides of the recess, the two extending portions being wrapped around to form the first and second side regions and the front region, inward-facing surfaces of the two extending portions being bonded to each other to form a first seal in the front region, at least one of the extending portions extending beyond the first seal and being further wrapped around to form the cover, the cover extending at least partially across the front region.

10 Claims, 10 Drawing Sheets

U.S. PATENT DOCUMENTS

2007/0154794 A1 * 7/2007 Kim et al. ............ 429/162

FOREIGN PATENT DOCUMENTS

| | | |
|---|---|---|
| EP | 1 049 180 A1 | 11/2000 |
| EP | 1 102 336 A1 | 5/2001 |
| EP | 1 519 428 A2 | 3/2005 |
| GB | 2 198 877 A | 6/1988 |
| JP | 62-154550 | 7/1987 |
| JP | 2000-164176 | 6/2000 |
| JP | 3070035 U | 7/2000 |
| JP | 2001-102090 | 4/2001 |
| JP | 2003-297302 A | 10/2003 |
| JP | 2004-055171 A | 2/2004 |
| JP | 2004-165134 | 6/2004 |
| JP | 2004-165134 A | 6/2004 |
| JP | 2005-079081 | 3/2005 |
| JP | 2005-166650 A | 6/2005 |
| KR | 10 1998-042828 A | 8/1998 |
| KR | 10-2004-0027365 A | 4/2004 |
| KR | 10-2004-0107868 A | 12/2004 |
| KR | 2005-0090780 * | 3/2005 |
| KR | 10-2005-0046636 | 5/2005 |
| KR | 10-2006-0103692 A | 10/2006 |

* cited by examiner

FIG. 1 (Conventional)
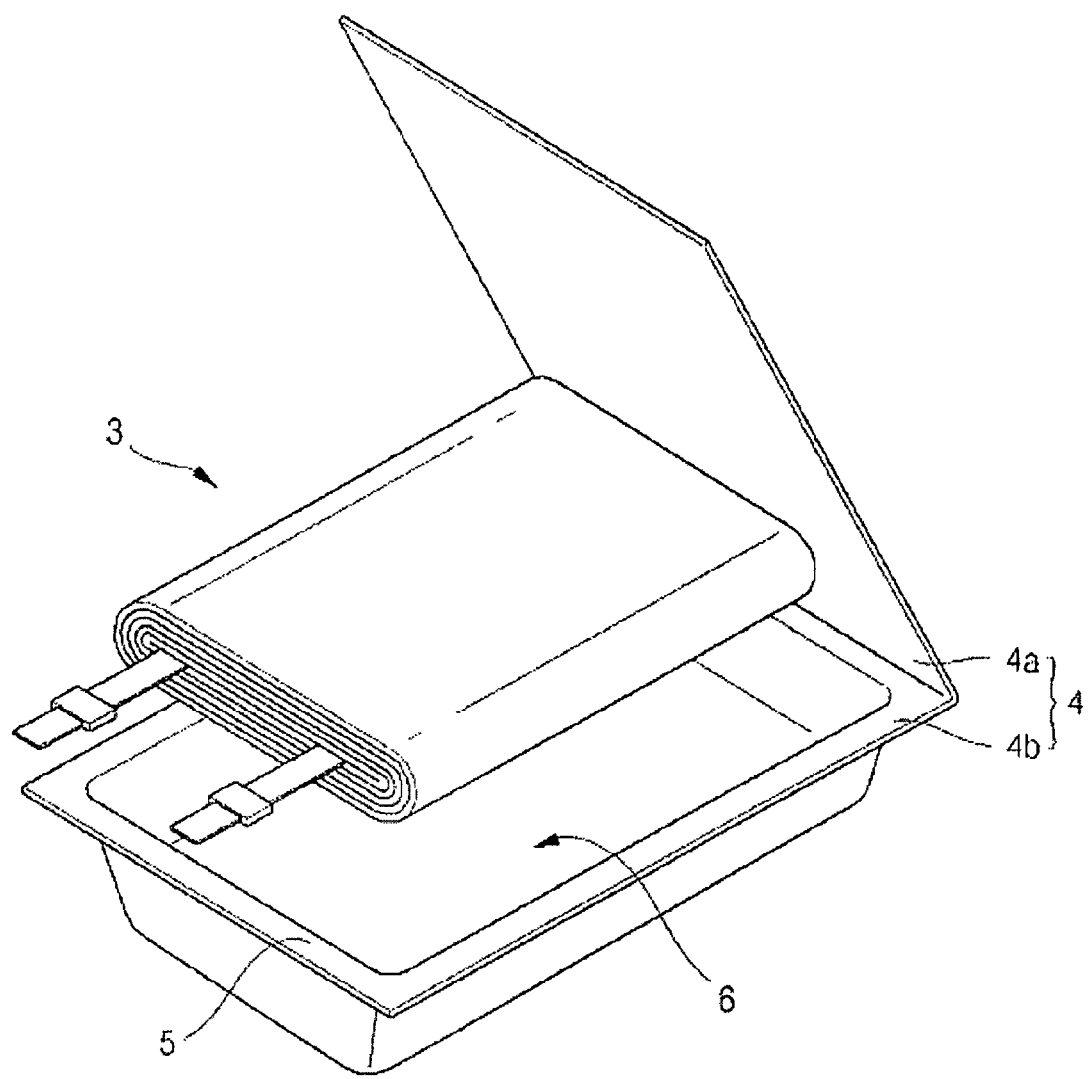

FIG. 2 (Conventional)
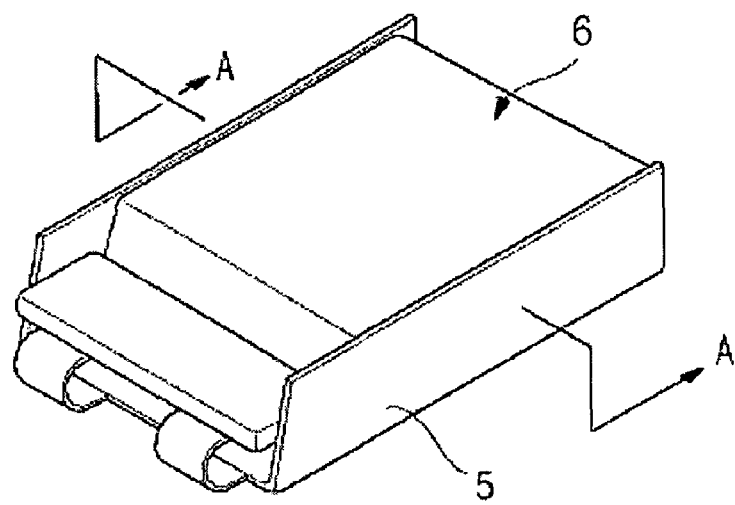
FIG. 3 (Conventional)
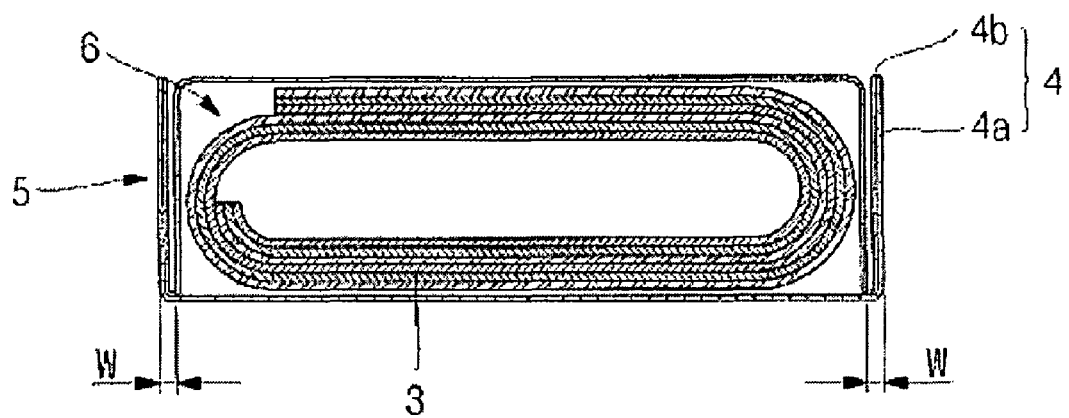

POUCH TYPE BATTERY AND METHOD OF MAKING THE SAME

BACKGROUND OF THE INVENTION

1. Field of the Invention

The present invention relates to a battery. More particularly, the present invention relates to a pouch type battery and a method of making the same.

2. Description of the Related Art

Batteries may employ any of a number of electrochemical technologies and may be manufactured in a variety of form factors. Generally, batteries may be classified as primary, or single use, and secondary, or rechargeable. Various battery technologies employ lithium, e.g., lithium secondary batteries, and generally use a non-aqueous electrolyte because of the reactivity between lithium and water. This electrolyte may be, e.g., a solid polymer containing lithium salts or a liquid in which lithium salts are dissociated in some type of organic solvent. Lithium secondary batteries include lithium metal and lithium-ion batteries using an organic liquid electrolyte, and lithium ion polymer batteries using a polymer solid electrolyte. In solid type lithium ion polymer batteries, there is little risk of leaking electrolyte, whereas in liquid or gel type lithium ion polymer batteries there is a chance of leaking the organic electrolyte.

For batteries where the risk of leaking electrolyte is low, a pouch may be used as the battery housing, in contrast to the metal can that is typically employed for batteries having a higher risk of leaking electrolyte. When the pouch is used, it is generally possible to reduce the weight and thickness of the battery and to freely change the shape of the battery, in comparison with the case where the metal can is used.

FIG. 1 illustrates a perspective view of a conventional pouch type battery before the pouch is sealed, FIG. 2 illustrates a perspective view of the battery of FIG. 1 after sealing and folding the pouch, and FIG. 3 illustrates a sectional view taken along the line A-A of FIG. 2. Referring to FIGS. 1-3, a conventional pouch type battery may include an electrode assembly 3 and a pouch material 4 accommodating the electrode assembly 3.

Referring to FIG. 1, a method of forming the conventional pouch type battery will now be described. First, the center of the roughly rectangular pouch material 4 may be folded to form a rear portion 4b and a front portion 4a. A recess 6 in which the electrode assembly 3 can be accommodated may be formed in the rear portion 4b. Sealing portions 5 may be used to seal the front and rear portions 4a and 4b together. A core cell formed as just described may be housed in a hard case to form a hard pack battery (not shown). Otherwise, both lengthwise ends may be dosed with a hot melt resin.

When the hard pack is formed using the bare cell without folding the sealing portions 5, the hard case may require additional space to accommodate the sealing portions 5. Therefore, the sealing portions 5 may be folded toward the respective sides of the recess 6, as illustrated in FIG. 2. Even when the pouch is not put in a hard case, the sealing portions 5 of the pouch may be folded to reduce the overall width of the battery.

As illustrated in FIG. 3, the recess 6 in the conventional pouch type battery may have side walls that are essentially straight or angled at close to 90°. Accordingly, when the sealing portions 5 are folded toward the recess 6, the folded sealing portions 5 are also essentially straight or slightly angled. As a result, if combined with the electrode assembly 3 having rounded sides, the interior portion of the conventional pouch type battery would not be efficiently filled. Thus, the electrical capacity of the battery per unit volume is not maximized. In addition, referring to FIG. 3, folding the sealing portions 5 in this manner increases the overall width of the bare cell by an amount 2W, where W is the width of each of the sealing portions 5 along the respective side surfaces of the pouch.

It will be appreciated that the conventional pouch type battery limits the size of the electrode assembly 3 that can be disposed therein, due to the additional 2W width of the pouch case that is occupied by the sealing portions 5. Moreover, if the pouch case is to be disposed in a hard case, during the assembly process the angled edges of the pouch case may contact the hard case, causing damage to the pouch case. Since the pouch may be very thin, the electrode assembly 3 may be easily damaged.

Additionally, the hard case may have a wall thickness of about 0.6 mm, which makes the completed battery thicker. Accordingly, if the device for which the conventional pouch type battery is intended imposes a limitation on the battery size, the electrical capacity of the battery may be reduced. Conversely, increasing the electrical capacity of the battery may require a larger battery, which may require design changes to other aspects of the device to be powered.

SUMMARY OF THE INVENTION

The present invention is therefore directed to a pouch type battery and a method of making the same, which substantially overcome one or more of the problems due to the limitations and disadvantages of the related art.

It is therefore a feature of an embodiment of the present invention to provide a pouch type battery configured to reduce an overall width of the battery, and a method of making the same.

It is therefore another feature of an embodiment of the present invention to provide a pouch type battery configured to increase a fraction of an interior volume that is available for an electrode assembly, and a method of making the same.

It is therefore a further feature of an embodiment of the present invention to provide a pouch type battery having a cover that protects the battery without significantly increasing the external dimensions of the battery.

At least one of the above and other features and advantages of the present invention may be realized by providing a pouch type battery including a pouch case including a front region, a rear region, first and second side regions, and a cover, wherein the first side region connects the front region to the rear region at a first side of the battery, and the second side region connects the front region to the rear region at a second side of the battery, the first and second sides being opposite to one another, the rear region has a recess therein to accommodate an electrode assembly, and two extending portions extend from first and second sides of the recess, the two extending portions being wrapped around to form the first and second side regions and the front region, inward-facing surfaces of the two extending portions being bonded to each other to form a first seal in the front region, at least one of the extending portions extending beyond the first seal and being further wrapped around to form the cover, the cover extending at least partially across the front region.

The cover may extend from the first seal across the front region in a first direction, one of the two extending portions may be a shorter extending portion that extends beyond the first seal by a first length, and the other of the two extending portions may be a longer extending portion that extends beyond the first seal by a second length, the second length being greater than the first length, and the longer extending portion may cover the shorter extending portion, the inward-facing surface of the longer extending portion facing an outward-facing surface of the shorter extending portion in the cover.

The pouch type battery may further include an electrode assembly disposed inside the pouch case in the recess, the electrode assembly including first and second electrodes with a separator interposed between the electrodes, the first electrode having a first electrode tab extending therefrom and the second electrode having a second electrode tab extending therefrom.

The pouch type battery may further include two flange portions that extend from upper and lower sides of the recess, the upper and lower sides being opposite to one another, wherein the flange portions may be bonded to the extending portions to form an upper seal and a lower seal, the electrode tabs may project from the electrode assembly through the upper seal so as to extend outside of the pouch case, and the lower seal may be folded against a lower side of the recess.

The first seal may extend longitudinally along the front region and may be disposed substantially in a center of the front region. Sides of the recess may be curved. The pouch type battery may further include an electrode assembly disposed in the recess, wherein the curved sides of the recess may have a curvature that is substantially the same as a curvature of a corresponding outer surface of the electrode assembly.

The cover may extend completely across the front, rear and first and second side regions. The cover may extend around the battery at least one time. The two extending portions may have multiple layers, the multiple layers including outward-facing surfaces of nylon, inward-facing surfaces of a polyolefin-based resin, and an inner layer between the outward and inward-facing surfaces, the inner layer being a thin metal film.

The pouch case may include a rear surface having the recess defined therein, the two extending portions formed by the rear surface, and a flange portion of the rear surface extends from a third side of the recess, the pouch case may include a front surface, the front surface including a first portion that extends across the recess and a peripheral portion that faces the flange portion and the extending portions, the peripheral portion may be sealed to the flange portion, the peripheral portion may be sealed to the two extending portions so as to form two doubled portions, the two doubled portions may be wrapped around to form the first and second side regions and the front region, the two doubled portions may be bonded to each other to form the first seal, and a section of at least one of the two doubled portions may extend beyond the seal to form the cover.

An end of the cover is attached to an underlying region of the pouch case. The first surface and the second surface may be integrally formed of one pouch material member that is folded approximately in half. The front surface may include a second recess, the front and rear surfaces being symmetrical. The doubled portions may include unsealed areas where the peripheral portion is not sealed to the two extending portions, the unsealed areas corresponding to areas of the cover that are folded. The pouch type battery may further include a reinforcing member disposed between the recess and the cover and/or between the first portion and the cover.

At least one of the above and other features and advantages of the present invention may be realized by providing a method of making a pouch type battery, including providing a pouch case having a recess formed therein, disposing an electrode assembly in the recess, forming a seal along a periphery of the recess, wrapping two extending portions that extend from the recess around the pouch case and bonding the extending portions to each other to form a second seal along a front region of the pouch case, and further wrapping at least one of the extending portions around the pouch case so as to form a cover that at least partially covers the front region.

The method may further include applying a predetermined tension to the extending portions while wrapping the extending portions around the pouch case, the predetermined tension sufficient to cause the extending portions to conform to an external shape of the electrode assembly. The method may further include attaching an end of the cover to an underlying region of the pouch case. The end of the cover may be attached to the underlying region of the pouch case adjacent to the second seal.

BRIEF DESCRIPTION OF THE DRAWINGS

The above and other features and advantages of the present invention will become more apparent to those of ordinary skill in the art by describing in detail exemplary embodiments thereof with reference to the attached drawings, in which:

FIG. 1 illustrates a perspective view of a conventional pouch type battery before the pouch is sealed;

FIG. 2 illustrates a perspective view of the battery of FIG. 1 after sealing and folding the pouch;

FIG. 3 illustrates a sectional view taken along the line A-A of FIG. 2;

DETAILED DESCRIPTION OF THE INVENTION

Figure 4:
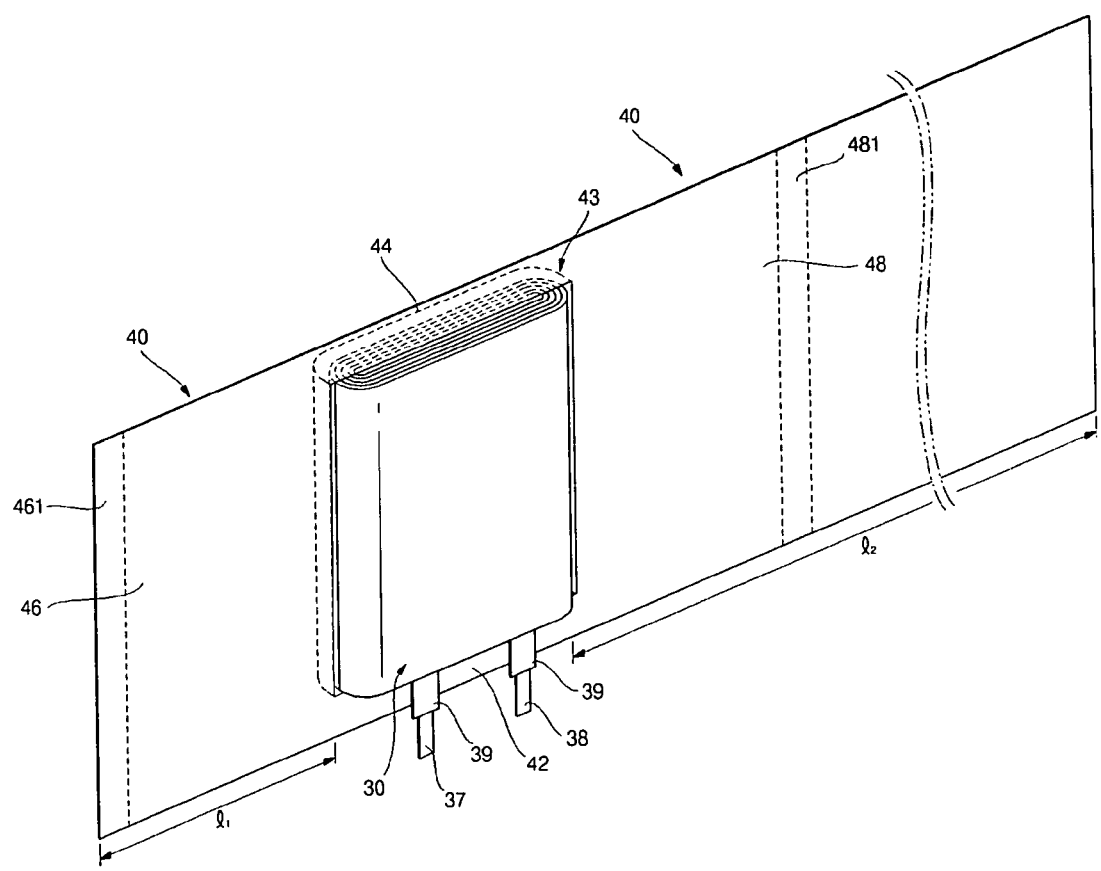
FIGS. 4-7 illustrate stages in a method of making a pouch type battery according to an embodiment of the present invention.

Korean Patent Application No. 10-2005-0134562, filed on Dec. 29, 2005, in the Korean Intellectual Property Office, and entitled: "Pouch Case and Pouch Type Secondary Battery Employing the Same," and Korean Patent Application No. 10-2005-0134553, filed on Dec. 29, 2005, in the Korean Intellectual Property Office, and entitled: "Pouch Type Battery and Method of Forming the Same," are incorporated by reference herein in their entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Structural details of a pouch type battery according to an embodiment of the present invention, as well as stages in a method of making the same, will now be described with reference to FIGS. 4-7. Referring first to FIGS. 4 and 5B, a pouch material 40 may have a recess 43 (dashed lines in FIG. 4) formed therein to accommodate an electrode assembly 30, the recess 43 including a bottom surface and four side walls. The recess 43 may have a depth that is only a fraction of the thickness of the electrode assembly 30, e.g., a depth that is about half the thickness of the electrode assembly 30, such that when the electrode assembly 30 is initially disposed in the recess 43 during assembly of the battery, it projects from the recess 43.

The pouch material 40 may be a multilayered material, which may include, e.g., a core formed of a metal such as aluminum (Al), a thermal fusion layer on the inward-facing surface, and an insulating layer on the outward-facing surface. The thermal fusion layer may be formed of, e.g., a modified polypropylene such as cast polypropylene (CPP) polymer resin, which functions as an adhesion layer. The insulating layer may be formed of, e.g., a resin such as nylon, poly(ethylene terephthalate) (PET), etc.

The electrode assembly 30 may be a multilayered electrode assembly that includes a lamination of a positive electrode 31, separators 33, and a negative electrode 35. The electrode assembly may be a jelly roll, which may be formed by winding the two electrodes 31 and 35 and the separators 33 around a mandrel in the order of a separator, an electrode, a separator, and the other electrode, or, alternatively, in the order of an electrode, a separator, the other electrode, and a separator. When the jelly roll is formed, in order to prevent the positive electrode 31 and the negative electrode 35 from being shorted, the separator 33 may be attached to the electrode surface exposed to the outside of the roll or to the internal electrode surface. The electrode assembly 30 may have an oval cross-section, as is the case for a prismatic battery, and may have curved sides as a result of being wound around the mandrel.

Each electrode may include, e.g., a slurry layer including an active material that is disposed on at least one surface of a collector, which may be, e.g., a metal foil or a metal mesh (not shown). Chalcogenide compounds, for example, composite metal oxides such as $LiCoO_2$, $LiMn_2O_4$, $LiNiO_2$, $LiNi_{1-x}Co_xO_2$ (0<x<1), $LiMnO_2$, etc., may be used as the active material of the slurry for one of the electrode collectors. Carbon (C) based materials, Si, Sn, tin oxides, composite tin alloys, transition metal oxides, lithium metal nitrides, lithium metal oxides, etc., may be used as the active material of the slurry for the other of the second electrode collectors. Each electrode may also include a respective tab coupled thereto, e.g., tabs 37 and 38, for electrical connection to the outside of the battery.

In an implementation (details not shown), one electrode may include a collector formed of aluminum (Al) and an electrode tab welded thereto, which may be, e.g., aluminum (Al), and which may protrude by a predetermined length. The other electrode may include a collector formed of copper (Cu) and an electrode tab welded thereto, which may be, e.g., nickel (Ni), and which may protrude by a predetermined length. Insulating tapes 39 may be provided for preventing the first electrode tab 37, the second electrode tab 38, and the pouch material 40 from being shorted. In particular, insulating tapes 39, e.g., resin tapes, may be provided where the electrode tabs 37 and 38 extend out of the battery, e.g., across a flange portion 42. The insulating tapes 39 may thus prevent the electrode tabs 37 and 38 from being shorted to the thin metal plate of the pouch material 40, and may assist in sealing the pouch.

The electrode tabs 37 and 38 may be electrically connected to accessories such as a protecting circuit module (PCM), a positive temperature coefficient (PTC) or similar structures (not shown), to form a core cell.

The recess 43 may be formed so that two opposing side walls are curved, e.g., using a deep drawing process. The curved shape of the two opposing side walls may correspond to the shape of the curved sides of the electrode assembly 30. Accordingly, when the electrode assembly 30 is disposed in the recess 43, the shape of the inner space defined by the recess 43 may closely conform to the shape of the electrode assembly 30, and, therefore, the inner space of the recess 43 may be efficiently used, thereby enhancing the electrical capacity of the battery per unit volume.

The recess 43 may have a substantially rectangular shape in plan view. Two flange portions 42 and 44 may extend away from the two short sides of the recess 43, i.e., away from upper and lower sides. Two extending portions 46 and 48 may extend away from the two long sides of the recess 43. The respective upper and lower edges of the flange portions 42 and 44 may be even with corresponding sides of the flange portions 42 and 44, such that the outer perimeter of the pouch material 40 is even and substantially rectangular, as illustrated in FIG. 4.

One of the two extending portions 46 and 48 may be longer than the other. For example, as illustrated in FIG. 4, the extending portion 46 may be relatively short, having a length $l_1$, and the extending portion 48 may be relatively long, having a length $l_2$. Such a shape may be obtained by performing the deep drawing process on the rectangular pouch exterior material 40 so as to form the recess 43 off-center.

Figure 5A:
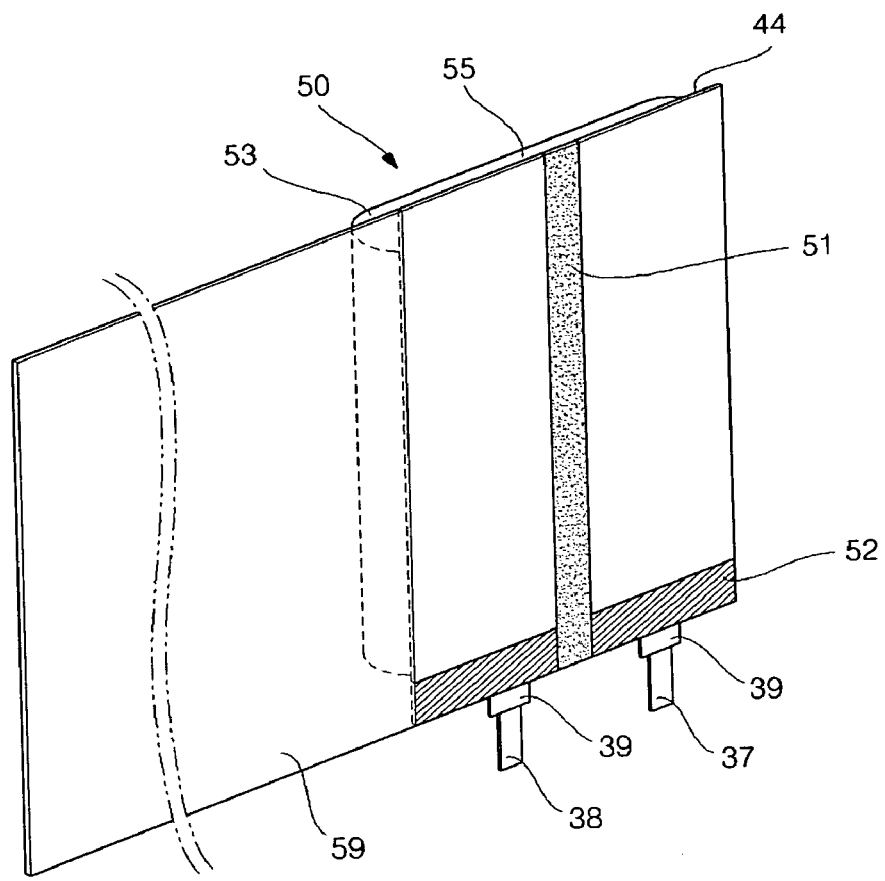
Figure 5B:
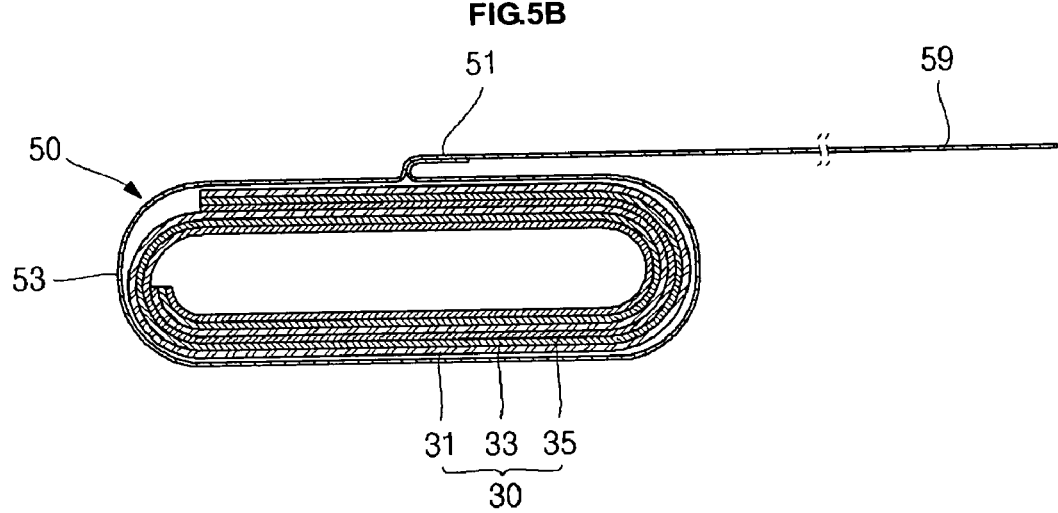

Referring to FIGS. 4 and 5A, further details of the method of making the pouch type battery will now be described. The extending portions 46 and 48 may be folded to cover the electrode assembly 30 that is disposed in the recess 43. The extending portions 46 and 48 may be folded along their boundaries with the recess 43 and the flange portions 42 and 44.

Referring to FIG. 4, the extending portions 46 and 48 may be folded so that area 461 in the extending portion 46 meets up with area 481 in the extending portion 48. The inward-facing surfaces of the extending portions 46 and 48 may be fused together where they meet, such that area 461 is fused to area 481.

Referring to FIG. 5A, the fused areas 461 and 481 may form a seal 51. The seal 51 may extend longitudinally along a front region of the pouch 50. Additionally, the pouch 50 may be sealed to form a seal 52 where the extending portions 46 and 48 are folded back across the flange portion 42, so as to leave one end of the pouch 50 remaining open and unsealed. The electrode tabs 37 and 38 may project through the seal 52 so as to be exposed outside the pouch 50.

When forming the seal 51 along the front region of the pouch 50, the two extending portions 46 and 48 may be pulled together, toward the center of the front region of the pouch 50, and then fused together along the areas 461 and 481. When the two extending portions 46 and 48 are pulled together in this way, they are wrapped around the electrode assembly 30 to form the front region of the pouch 50. As described above, the recess 43 may have a depth that is shallower than the thickness of the electrode assembly 30 such that, when the electrode assembly 30 is initially disposed in the recess 43, it partially projects therefrom. Accordingly, when wrapping the extending portions 46 and 48 around the electrode assembly 30 to form the front region of the pouch 50, the extending portions 46 and 48 may be pulled tightly around the electrode assembly 30, which acts as a supporting reference surface. Therefore, side regions 53 of the pouch 50 may be curved surfaces having substantially the same shape as the shape of the external surface of the electrode assembly 30.

A cover region 59 may remain beyond the seal 51, the cover region 59 being formed by an area of one or both extending parts 46 and 48 that extend beyond the areas 461 and 481. Referring to FIG. 4, only the extending part 48 extends beyond the respective sealing area 481. However, both the extending part 48 and the extending part 46 may extend beyond the respective sealing areas 48 and 46. Further details of the cover region 59 will be described below.

Figure 6:
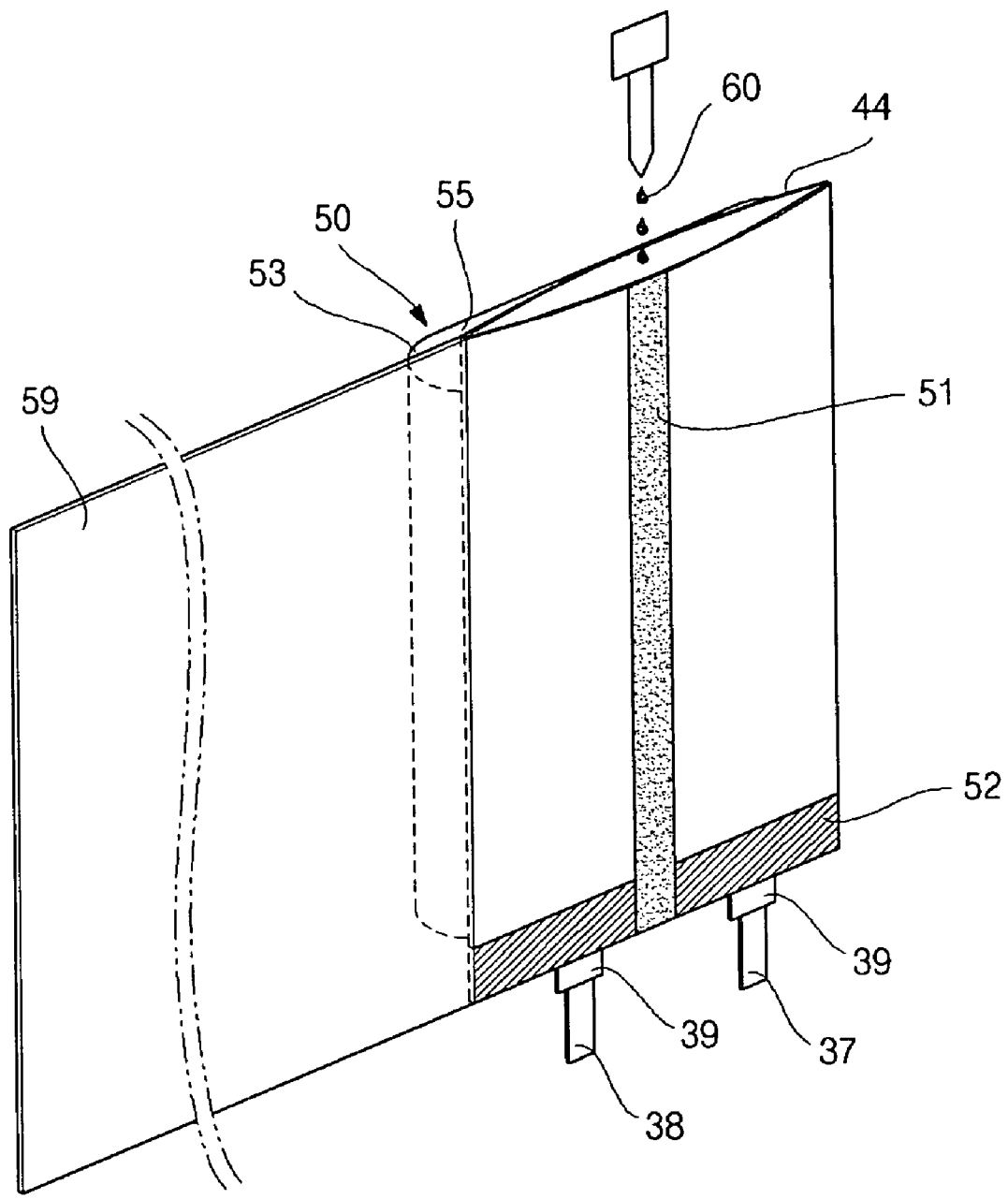

Referring to FIG. 6, an electrolyte 60 may be supplied to the electrode assembly 30 in the interior of the battery by way of the as-yet unsealed area along the flange portion 44, which may be an end of the battery opposite to the end from which the electrode tabs 37 and 38 project. The unsealed area along the flange portion 44 may then be sealed, as described below. Of course, the sealing operations may be performed in a different order such that the seal 52 is formed last, with the electrolyte 60 being injected by way of the flange portion 42.

Since the electrolyte 60 may be injected through the opened flange portion at the end of the battery, the end surface of the electrode assembly 30 may be exposed to the injected electrolyte 60, which may easily enter into the interstices of the electrode assembly 30 by infiltrating between the electrode plates 31 and 35 and the separators 33.

After introducing the electrolyte 60 into the battery, the flange portion 44 may be sealed, e.g., through a thermal fusion process, to the surfaces of the extending portions 46 and 48 that are wrapped around to form the front portion of the battery, i.e., to the facing surfaces of the extending portions 46 and 48. Thus, a seal 57 may be formed along the flange portion 44 (see FIG. 7). The battery may thus be completely sealed.

Further details of the structure and formation of the cover region 59 will now be described with reference to FIGS. 5A, 5B and 7. As described above, one or both of the extending portions 46 and 48 may extend beyond the seal 51 to form the cover region 59. For simplicity, an example wherein only the extending portion 48 extends beyond the seal 51 will be described, although it will be appreciated that the present invention is not limited to this example.

Referring to FIGS. 5A and 5B, the cover region 59 may extend from the seal 51 along the front region of the pouch 50 in a first direction. In addition, the seal 51 may be folded over in the first direction. Such a structure may be formed by pulling the cover region 59 in the first direction after forming the seal 51. Referring to FIG. 7, the cover region 59 may be wrapped around the exterior surface of the pouch 50. The cover region 59 may extend around the pouch 50 by a predetermined amount, e.g., part way across the front region of the pouch 50, entirely around the pouch 50, i.e., across the front region, the rear region and both side regions, or more than once around the pouch 50.

The cover portion 59 may wrap the pouch 50 so that the longer extending portion, e.g., the extending portion 48, covers the shorter extending portion, e.g., the extending portion 46. Referring to FIG. 5B, the cover portion 59 may be folded at the seal 51 such that the inward-facing surface of the longer extending portion 48 continues to face inward, i.e., the fold may be such that the shorter extending portion 46 is folded back on itself, while the longer extending portion 48 continues in the first direction. The end of the cover portion 59 may be attached to the underlying exterior surface of the pouch 50 using, e.g., heat, adhesives, adhesive tape, etc.

Figure 7:
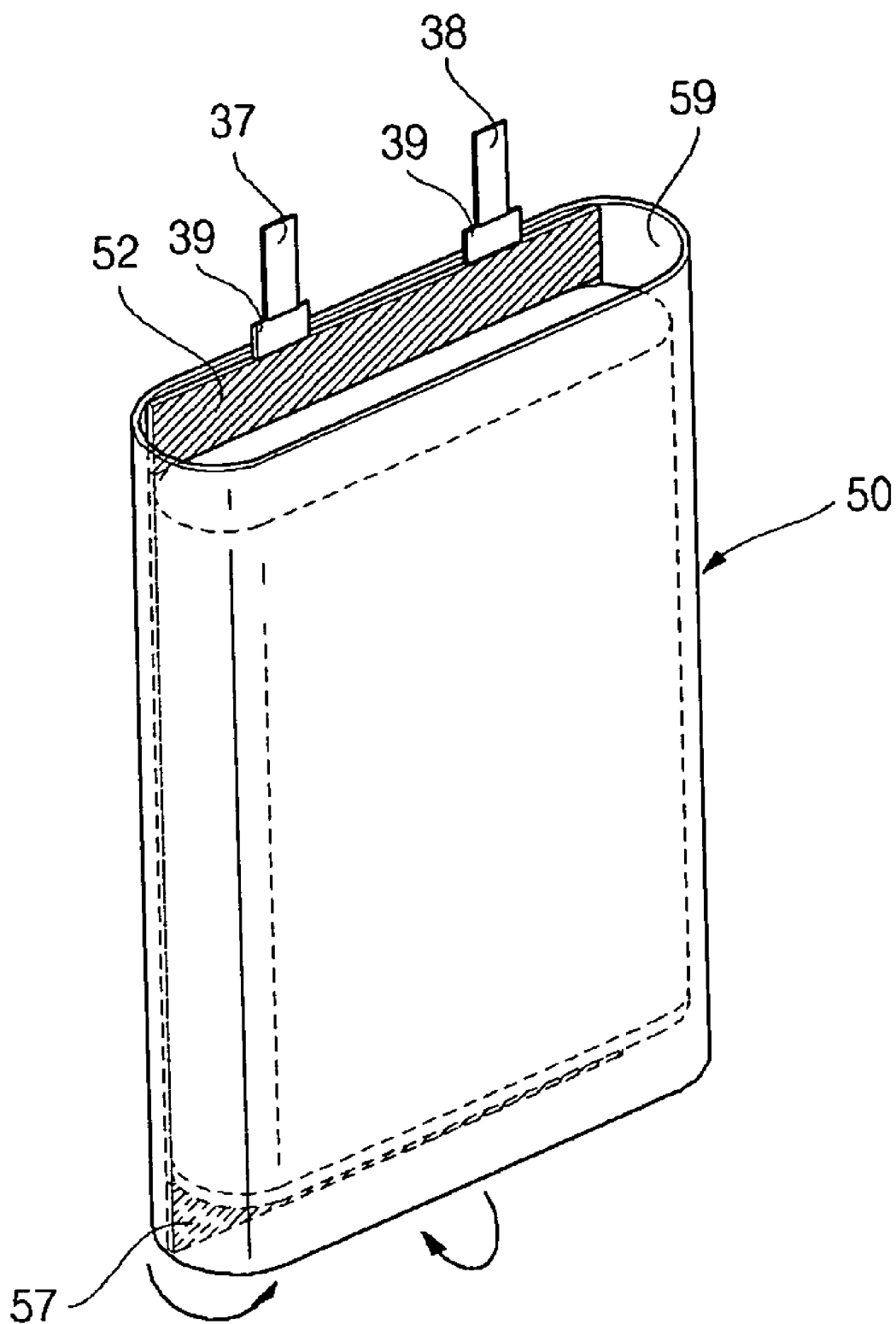

Lastly, referring to FIG. 7, the seal 57 may be folded to cover the end surface of the pouch 50 (i.e., surface 55 of FIG. 6), which may correspond to a short edge of the recess 43. At this time, the folded seal 57 may strengthen the rear surface of the pouch 50 and may protect the end of the pouch 50.

In a pouch type battery according to an embodiment of the present invention, the pouch case may provide satisfactory strength when formed as described above. Accordingly, the exterior material of the core cell may be formed of a resin mold that completes the upper and lower portions of the core cell, without an additional hard case enclosing the core cell.

Where a gas chamber is used in initial charging and discharging processes when the pouch is formed, the gas chamber may be formed in the lower sealing portion of the pouch (not shown).

The seal 51 on the front region of the pouch 50 may be positioned between the two electrode tabs 37 and 38 in the width direction of the front region, and may be positioned at or near the center of the front region of the pouch 50.

The electrode tabs 37 and 38 may have a thickness of about 0.1 mm. Spaces between the electrodes 31 and 35 and the separators 33, and the spaces between the electrode assembly 30 and the walls of the pouch 50, may not be sufficient for the portions in which the electrode tabs 37 and 38 are formed in the electrode assembly 30, based on the width of the pouch 50. Therefore, the electrode tabs 37 and 38 may be separated from the electrode assembly 30, so as not to overlap the electrode assembly 30. Since the sides of the electrode assembly 30 may be curved, the space between the electrodes 31 and 35 may be small in the electrode assembly 30. On the other hand, in the remaining portion where the electrode tabs 37 and 38 are not positioned, that is, between the electrode tabs 37 and 38, the space between the electrodes 31 and 35 may be relatively large. Therefore, when the seal 51 on the front region is disposed in the portion in the outside of the pouch 50, the actual thickness may be insignificantly increased. In the process of creating the seal 51 on the front region, the narrow side surfaces of the pouch 50 may be curved and correspond in shape to the external surface of the electrode assembly 30.

Such a design may prove advantageous to apparatus makers, since the two narrow side surfaces of the pouch 50 can be curved due to the design of the pouch type battery, and, accordingly, the designs of electrical and electronic apparatuses such as mobile telephones in which the pouch type battery may be mounted can be optimized to take advantage of a reduced size of the battery and/or an enhanced electric capacity per unit volume of the battery. That is, since the electrode assembly 30 in the pouch 50 may be oval in cross-section, the narrow side surfaces of the pouch 50 may be similarly curved, and the inside of the pouch 50 may be efficiently filled with the electrode assembly 30, i.e., without wasting space, so that it is possible to increase the capacity of the battery per unit volume of the battery.

Figure 8:
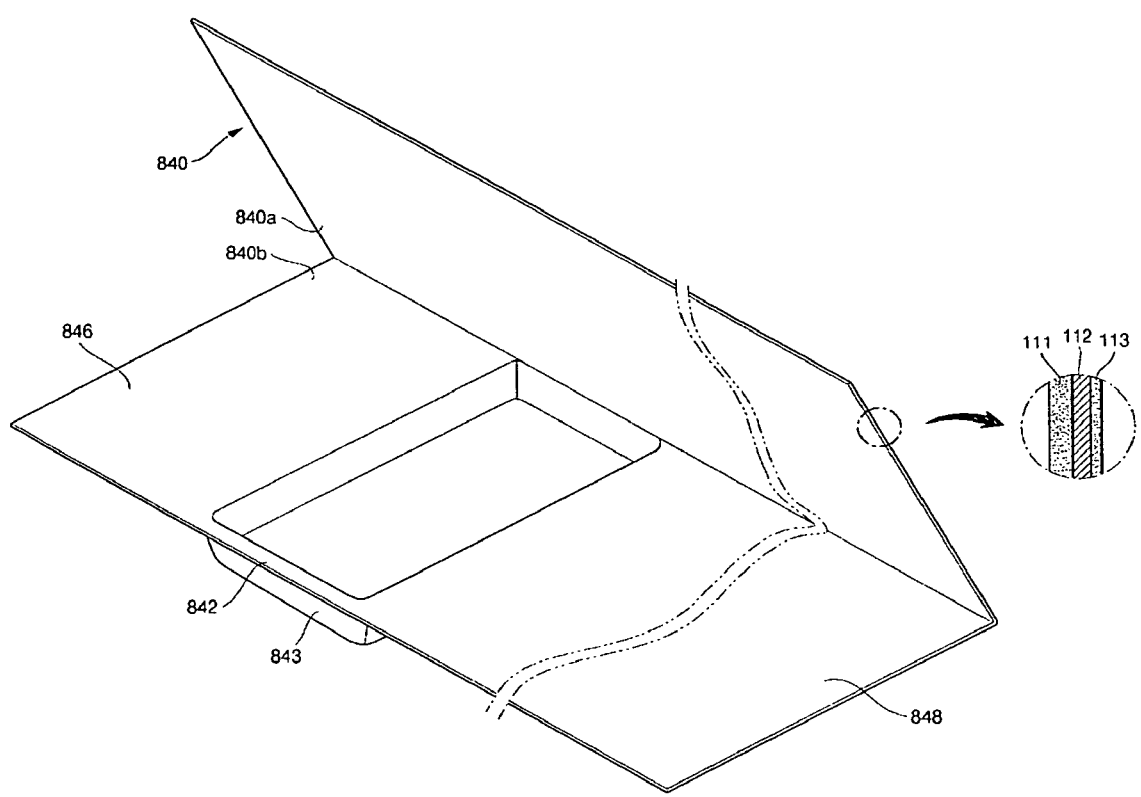
FIG. 8 illustrates a perspective view of a pouch case according to an embodiment of the present invention.

Hereinafter, additional embodiments of the present invention will be described in detail with reference to FIGS. 8 and 9A-9C. FIG. 8 illustrates a perspective view of a pouch case according to an embodiment of the present invention, and FIGS. 9A-9C illustrate plan views of options for a sealing operation for the pouch case of FIG. 8.

Referring to FIG. 8, a pouch type battery may be formed by providing a pouch material 840 that is configured to be folded over. The pouch material 840 may include layers 111, 112 and 113, which may be a modified polypropylene fusion layer, a metal core, and a nylon or PET insulating layer, respectively.

The pouch material 840 may have a rear portion 840b with a recess 843 formed therein, and a front portion 840a having a size matching the size of the rear portion 840b, with the front portion 840a configured to be sealed to the rear portion 840b. The size of the pouch material 840 and the location of the recess 843 therein may be configured so as to provide extending portions 846 and 848 that extend away from the recess 843. A flange portion 842 may be disposed along an edge of the recess 843, e.g., along a short edge opposite to the fold in the pouch material 840.

Figure 9A:
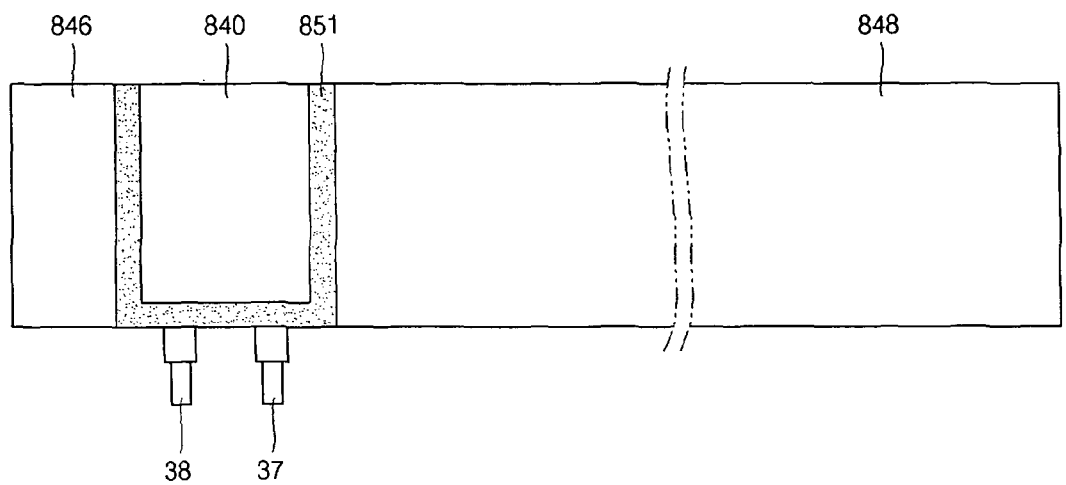
FIGS. 9A-9C illustrate plan views of options for a sealing operation for the pouch case illustrated in FIG. 8.
Figure 9B:
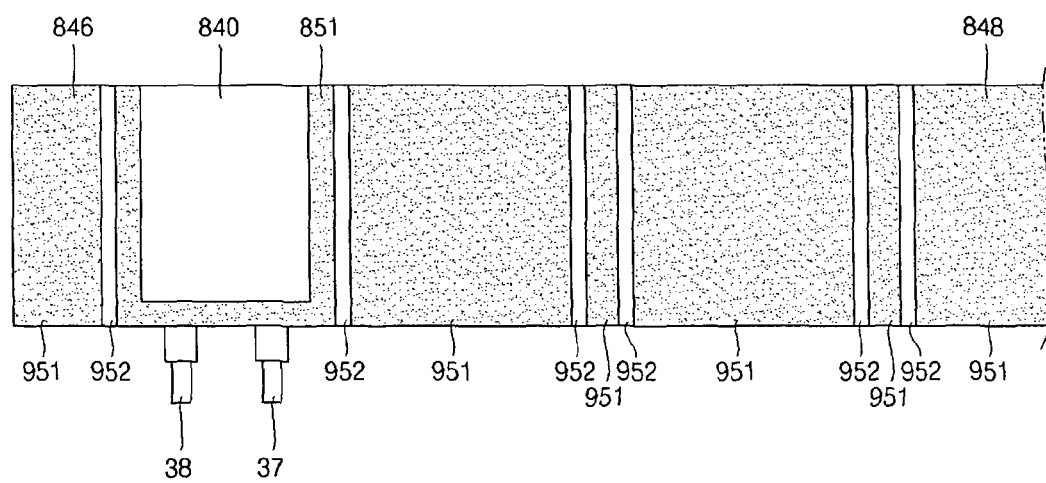
Figure 9C:
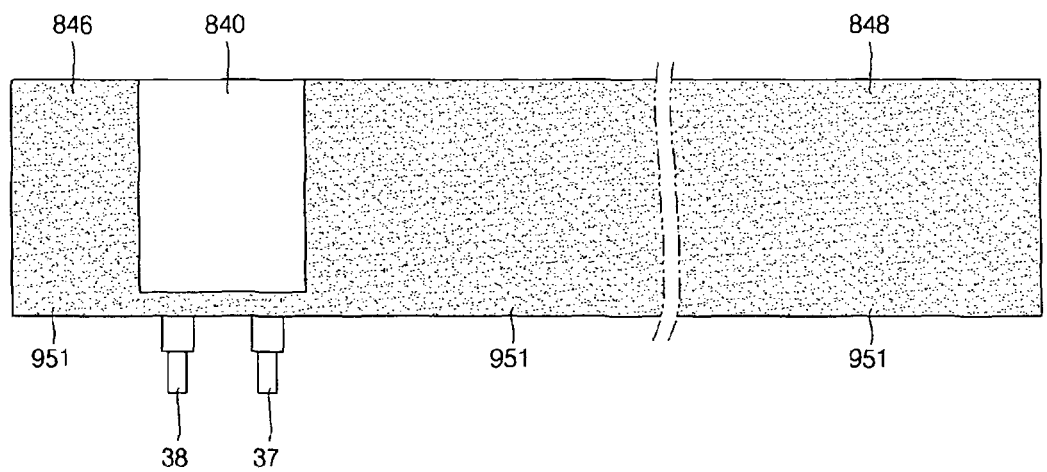

Referring to FIGS. 8 and 9A, the front portion 840a may be folded to cover the rear portion 840b to enclose an electrode assembly therein. Tabs 37 and 38 of the electrode assembly may extend across the flange portion 842 so as to be exposed to the outside of the pouch.

Referring to FIG. 9A, areas of the front and rear portions 840a and 840b that adjoin the recess 843 may be sealed together to seal the pouch using, e.g., a thermal fusing process. A seal 851 may thus be formed along three sides of the recess 843, with the fourth side being intrinsically sealed by the fold in the pouch material 840. Due to the folding of the pouch material 840, each of the extending portions 846 and 848 may have two layers that respectively correspond to the front and rear portions 840a and 840b of the pouch material 840.

The two extending portions 846 and 848 may be longitudinally formed, so that a portion of a polyolefin layer that is the internal layer of the pouch material 840 does not come out, even though external pressure is applied by fusion, and so that the external appearance is fine. Also, the thickness of the polyolefin layer is not limited, so that a firm adhesive portion is formed while the polyolefin layer is cooled to be hardened.

When fusion is performed as illustrated in FIG. 9A, at least one of the extending portions 846 and 848 may wrap the entire pouch. This may help protect the battery against an external shock, so that the reliability of the pouch type battery is improved. Since the battery may be protected without requiring an additional hard case, it may be possible to reduce the thickness of the completed battery and to meet various needs of users. Also, since less area may be required for seals, it may be possible to increase the capacity of the battery.

FIG. 9B illustrates another option for sealing the pouch type battery of FIG. 8. Referring to FIGS. 8 and 9B, the front portion 840a and the second portion 840b may be largely fused together to form the sealing area 851 and additional sealing areas 951, e.g., using a thermal fusing process, but without fusing folding areas 952 where the pouch material 840 is to be folded. That is, folding areas 952 may be left unfused, so that the folding areas 952 are not hardened and the entire pouch can be easily wrapped by one or both of the extending portions 846 and 848. The sealing areas 851 may harden on cooling, which may help protect the pouch type battery against external shock.

FIG. 9C illustrates another option for sealing the pouch type battery of FIG. 8. Referring to FIGS. 8 and 9C, the extending portions 846 and 848 may be entirely sealed together, using, e.g., a thermal fusing process, and, upon cooling, the thermally fused sealing areas 951 can harden to protect the enclosed electrode assembly against external shock. The extending portions 846 and 848 may form a cover that is wrapped around the pouch as described above, in order to enhance the resistance of the pouch type battery against external shock.

Figure 10:
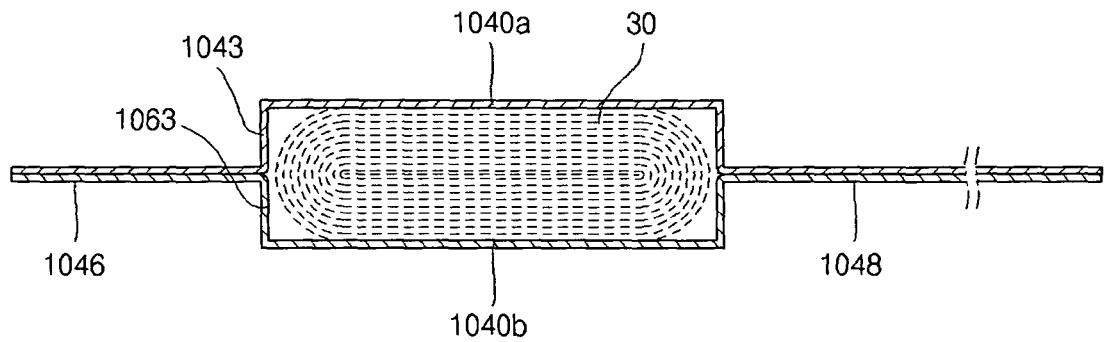
FIG. 10 illustrates a sectional view of a pouch type battery according to a further embodiment of the present invention.

Hereinafter, a further embodiment of the present invention will be described in detail with reference to FIG. 10. Referring to FIG. 10, a recess 1043 may be formed in a portion of pouch material 1040a, and a corresponding recess 1063 may be formed in a portion of pouch material 1040b. The recesses 1043 and 1063 may be substantially symmetrical and may have a same depth. The two corresponding recesses 1043 and 1063 may substantially enclose the electrode assembly 30. While the cross-section illustrated in FIG. 10 illustrates the recesses 1043 and 1063 as having square corners, it will be appreciated that the pouch materials 1040a and 1040b may be pulled tightly around the electrode assembly 30, so as to cause the sides of the recesses 1043 and 1063 to closely conform to the external shape of the electrode assembly 30. Accordingly, the recesses 1043 and 1063 may have rounded sides matching the rounded ends of the electrode assembly 30. That is, the depth of recesses 1043 and 1063 may be reduced by limiting the depth during the drawing process, so that pulling tight the pouch materials 1040a and 1040b causes them to closely conform to the electrode assembly 30, thereby reducing or eliminating wasted space within the pouch and enhancing the capacity of the battery per unit volume. Alternatively or in addition, the recesses 1043 and 1063 may be initially formed with curved surfaces, as described above in connection with FIG. 4. The two extending portions 1046 and 1048 may extend from the recesses 1043 and 1063 in a similar fashion to the previously-described embodiments.

Figure 11A:
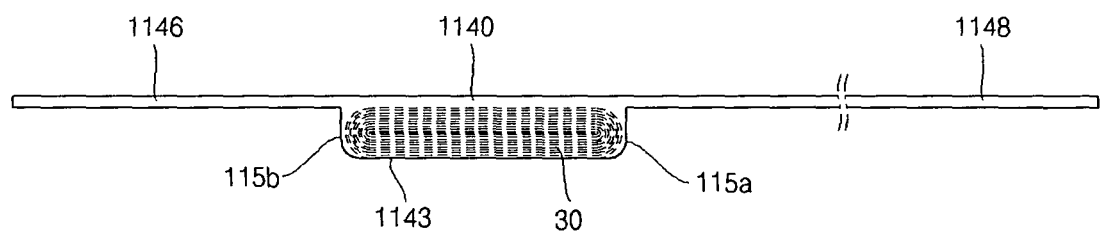
FIGS. 11A-11E illustrate stages in a method of making a pouch type battery according to another embodiment of the present invention.
Figure 11B:
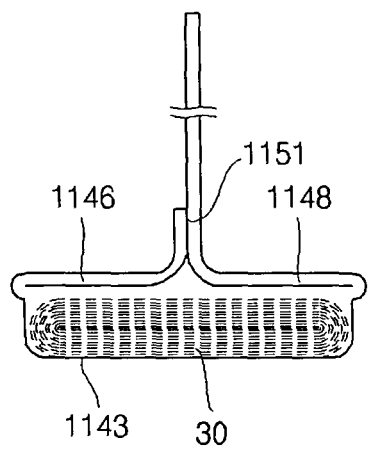
Figure 11C:
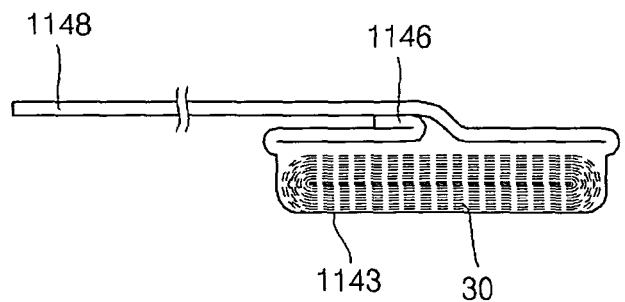
Figure 11D:
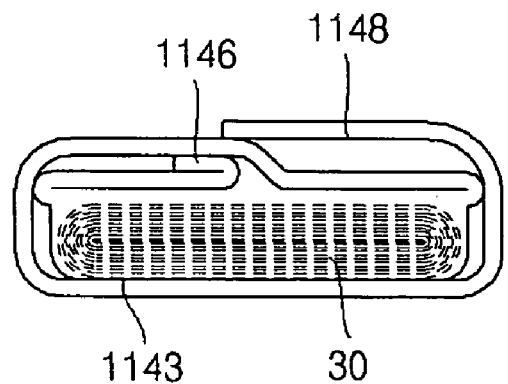
Figure 11E:
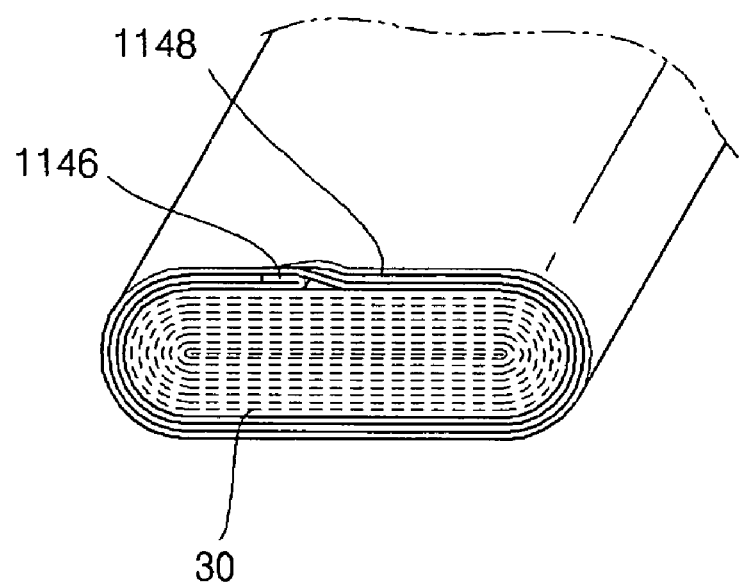

Hereinafter, another embodiment of the present invention will be described in detail with reference to FIGS. 11A-11D, which illustrate stages in a method of making a pouch type battery. Referring to FIG. 11A, an electrode assembly 30 may be placed into a recess 1143. Referring to FIG. 11B, two extending portions 1146 and 1148 may be fused to form a seal 1151 in the pouch material 1140 along the front region of the pouch. Referring to FIG. 11C, the two extending portions 1146 and 1148 may be folded in a first direction to form a cover portion for wrapping the pouch. The longer extending portion, e.g., extending portion 1148, may cover the shorter extending portion, e.g., extending portion 1146. The extending portions 1146 and 1148 may be folded such that the shorter extending portion, e.g., extending portion 1146, is folded back on itself. Referring to FIG. 11D, the cover portion, i.e., an area of the extending portions 1146 and 1148 that extends beyond the seal 1151, may wrap the entire pouch one or more times. The end of the longer extending portion, e.g., the end of extending portion 1148, may align with the seal 1151 on the front region of the pouch. Referring to FIG. 11E, the cover portion may be attached to the surface of the pouch after wrapping the entire pouch. In other implementations (not shown), the end of the longer extending portion, e.g., the end of extending portion may be attached to the bottom surface of the recess, or to either side surface, etc. Bonding may be performed using, e.g., thermal compression, insulating tape, etc.

Figure 12:
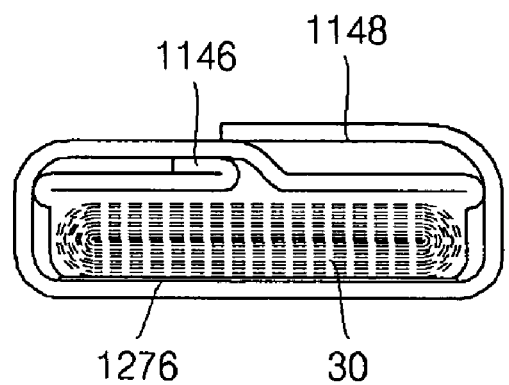
FIG. 12 illustrates a sectional view of a pouch type battery having a reinforcing member according to an embodiment of the present invention.

Still another embodiment of the present invention will now be described in detail with reference to FIG. 12, which illustrates a sectional view of a pouch type battery having a reinforcing member. Referring to FIG. 12, a reinforcing member 1276 may be provided on at least one side surface of the four side surfaces of the pouch. The reinforcing member 1276 may be formed of, e.g., a thin metal plate, a thin metal plate covered with an adhesive resin, a fiber reinforcing resin, an insulating tape, etc. For example, the reinforcing member 1276 may be attached to the external surface of the pouch by thermal compression, with the adhesive resin interposed between the reinforcing member 1276 and the pouch. Other processes may be employed if the reinforcing member 1276 is adhered using the insulating tape.

The pouch type battery manufactured as described above may be directly used as a battery for, e.g., a personal digital assistant (PDA), after coupling a resin molding or an additional cap with the upper and lower ends of a protecting circuit board.

A pouch type battery according to an embodiment of the present invention may be used for a lithium secondary battery.

Unlike a conventionally-formed pouch type battery having a square recess, a pouch type battery according to an embodiment of the present invention may have narrow, curved side walls of the pouch that accommodate the electrode assembly. Thus, the pouch type battery according to an embodiment of the present invention may be easily mounted in electrical and electronic apparatuses, including those that are designed to be curved.

Also, when the narrow side walls of the pouch are curved, since it may be possible to accommodate the electrode assembly having the oval cross section without wasting space, and since it may be possible to reduce the width of the pouch in comparison with the configuration wherein the sealing portions of the pouch are positioned on the narrow side surfaces of the pouch, it may thus be possible to increase the capacity of the battery per unit volume of the battery.

Also, since it may be possible to directly inject the electrolyte into the front or rear part of the electrode assembly, it may be possible to reduce the time spent on injecting the electrolyte.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A pouch type battery, comprising:
   a pouch case including a front region, a rear region, first and second side regions, and a cover, wherein:
   the first side region connects the front region to the rear region at a first side of the battery, and the second side region connects the front region to the rear region at a second side of the battery, the first and second sides being opposite to one another,
   the rear region has a recess therein that accommodates an electrode assembly, the recess having a depth that is shallower than a thickness of the electrode assembly such that a portion of the electrode assembly partially projects from the recess; and
   two extending portions extend from first and second sides of the recess, the two extending portions being wrapped around the portion of the electrode assembly that partially projects from the recess to form the first and second side regions and the front region, inward-facing surfaces of the two extending portions being bonded to each other to form a first seal in the front region, at least one of the extending portions extending beyond the first seal and being further wrapped around to form the cover, the cover extending at least partially across the front region.

2. The pouch type battery as claimed in claim 1, wherein:
   the cover extends from the first seal across the front region in a first direction,
   one of the two extending portions is a shorter extending portion that extends beyond the first seal by a first length, and the other of the two extending portions is a longer extending portion that extends beyond the first seal by a second length, the second length being greater than the first length, and
   the longer extending portion covers the shorter extending portion, the inward-facing surface of the longer extending portion facing an outward-facing surface of the shorter extending portion in the cover.

3. The pouch type battery as claimed in claim 1, wherein the electrode assembly includes first and second electrodes with a separator interposed between the electrodes, the first electrode having a first electrode tab extending therefrom and the second electrode having a second electrode tab extending therefrom.

4. The pouch type battery as claimed in claim 3, further comprising:
   two flange portions that extend from upper and lower sides of the recess, the upper and lower sides being opposite to one another, wherein:
   the flange portions are bonded to the extending portions to form an upper seal and a lower seal,
   the electrode tabs project from the electrode assembly through the upper seal so as to extend outside of the pouch case, and
   the lower seal is folded against a lower side of the recess.

5. The pouch type battery as claimed in claim 1, wherein the first seal extends longitudinally along the front region and is disposed substantially in a center of the front region.

6. The pouch type battery as claimed in claim 1, wherein sides of the recess are curved.

7. The pouch type battery as claimed in claim 6, wherein the curved sides of the recess have a curvature that is substantially the same as a curvature of a corresponding portion of an outer surface of the electrode assembly.

8. The pouch type battery as claimed in claim 1, wherein the cover extends completely across the front, rear and first and second side regions.

9. The pouch type battery as claimed in claim 8, wherein the cover extends around the battery at least one time.

10. The pouch type battery as claimed in claim 1, wherein the two extending portions have multiple layers, the multiple layers including outward-facing surfaces of nylon, inward-facing surfaces of a polyolefin-based resin, and an inner layer between the outward and inward-facing surfaces, the inner layer being a thin metal film.

* * * * *